March 16, 1943. A. C. LUSHER ET AL 2,314,000
HIGH PRESSURE HOSE COUPLING
Filed Nov. 26, 1940  2 Sheets-Sheet 1
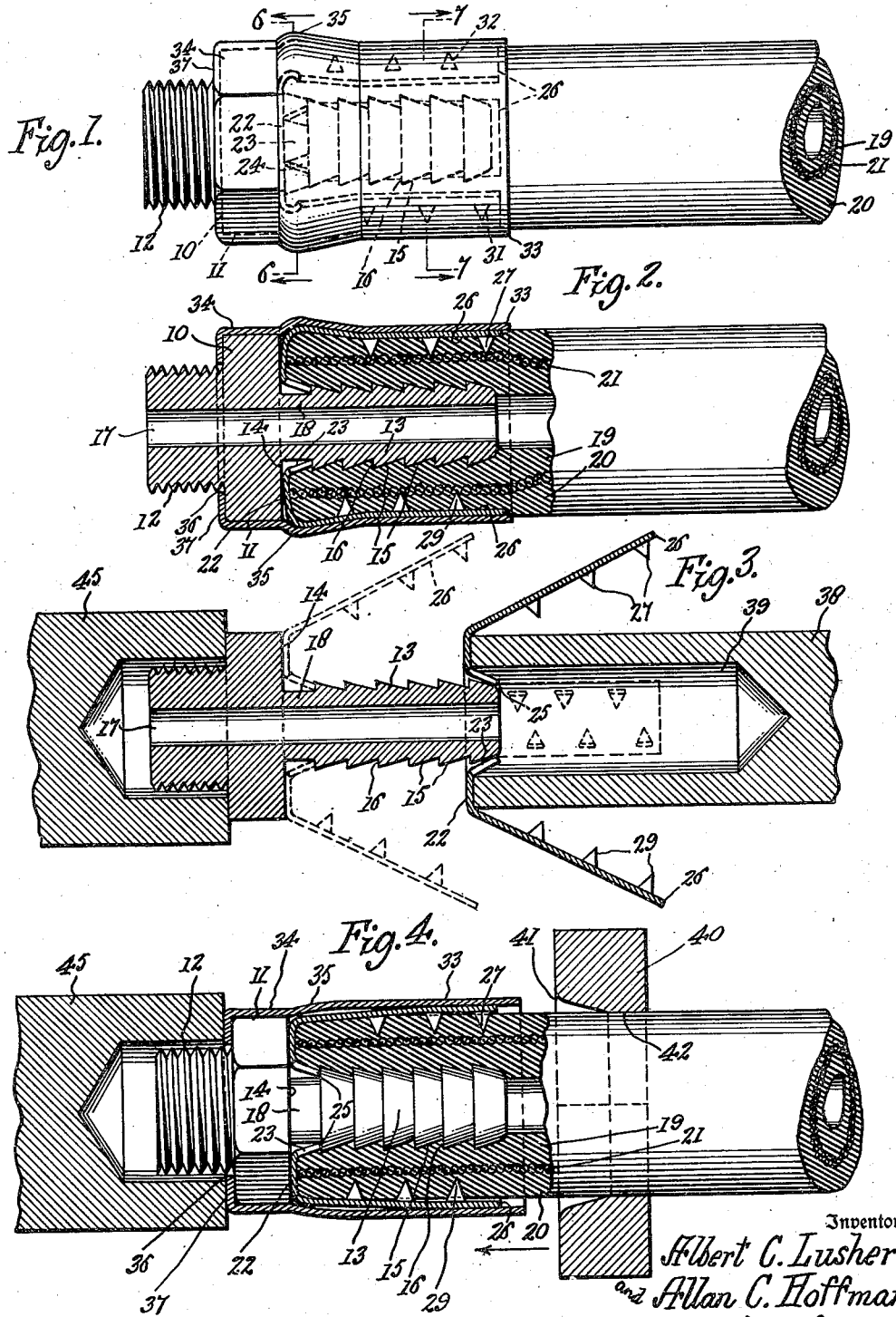
Inventors
Albert C. Lusher
and Allan C. Hoffman
by Mawhinney & Mawhinney
Attorneys.

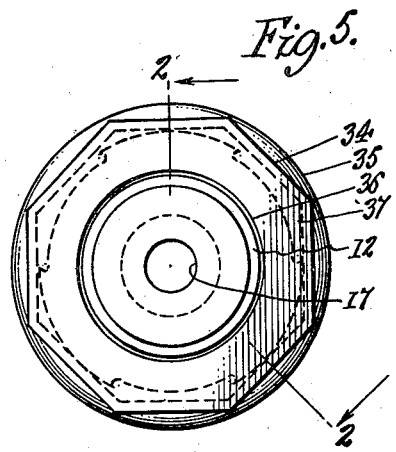
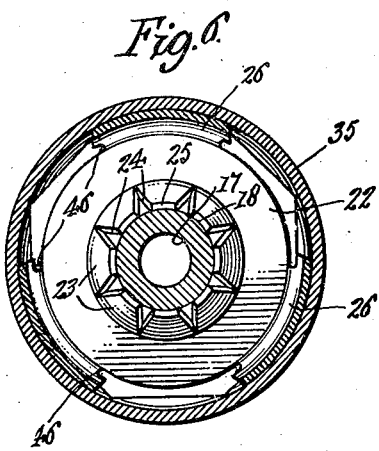
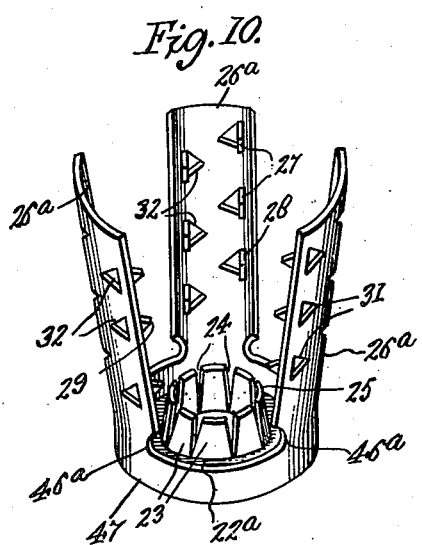
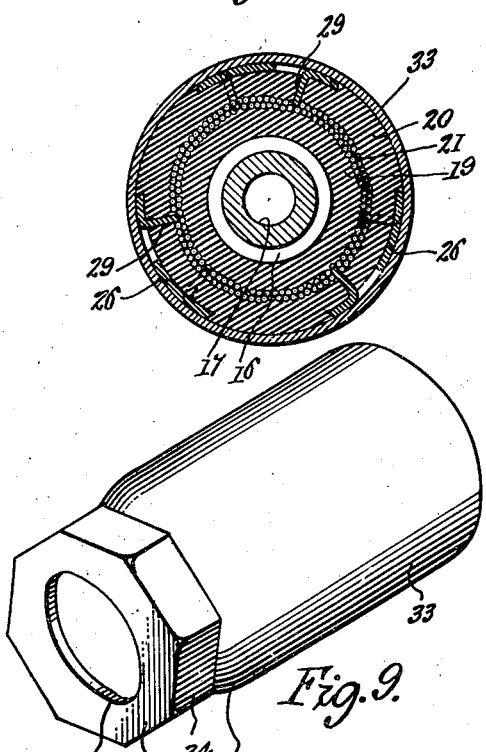
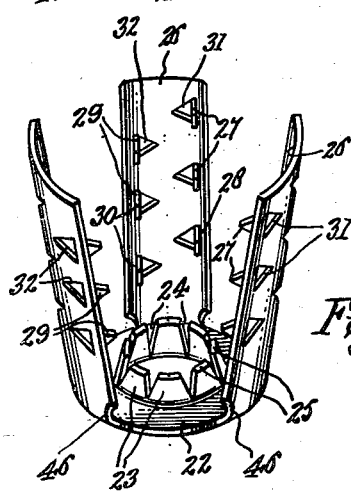

Patented Mar. 16, 1943

2,314,000

UNITED STATES PATENT OFFICE 2,314,000

HIGH PRESSURE HOSE COUPLING

Albert C. Lusher, Waterbury, and Allan C. Hoffman, Milldale, Conn., assignors to Scovill Manufacturing Company, Waterbury, Conn., a corporation of Connecticut Application November 26, 1940, Serial No. 367,302

10 Claims. (Cl. 285—84)

The present invention relates to improvements in high pressure hose couplings, and has for an object to provide an improved coupling of this or other types in which the hose and the coupling body will be more strongly united against axial separation and leakage and against blowouts due to high pressure such as a failure of the union between hose and coupling body.

Another object of this invention is to provide a high pressure coupling, that for the most part is made of light weight sheet metal materials, is die contracted, and is capable of relatively easy assembly to the end of a hose such as by means of a hydraulic or jack press. The coupling is further designed to be secured to the end of a high pressure hose without the necessity of having to strip the outer layer of covering material down to the reinforcing wire braiding or mesh customarily found disposed intermediately in high pressure hose and involves a clamping means of suitable material capable of penetrating the outer layer of the hose material to become embedded or gripped into the wire mesh as a secure anchorage. Further this clamping means is designed to interlock with the coupling member to preclude any axial displacement thereof due to pull strains upon the hose.

A further object of the invention is to compress and at the same time interlock the hose about the nipple wherein the interlocking is strong against axial displacement or separation of the hose from the coupling.

A still further object of the invention is to secure a high degree of leak-proof characteristics in a hose coupling in an economical manner by retaining substantially unchanged the conventional type of coupling body, with the addition thereto of such interlocking and compression and contraction means as may be fitted to, and received on, the coupling body in an easily assemblable manner, which involves small costs in materials and labor and which when in final position will yield a high degree of utility as a high pressure coupling.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevation of an improved high pressure hose coupling constructed in accordance with the present invention shown in coupling position.

Figure 2 is a longitudinal section taken through the same along the line 2—2 of Figure 5.

Figure 3 is a longitudinal section taken through the coupling member, clincher member and a plunger tool showing the method of assembly.

Figure 4 is a longitudinal section through the coupling, showing a stage of assembly subsequent to Figure 3 and also illustrating the die in position just prior to contracting the sleeve and the included parts.

Figure 5 is an end view taken from the left end of Figure 1 on an enlarged scale.

Figure 6 is a transverse section taken on the line 6—6 of Figure 1.

Figure 7 is a similar view taken on the line 7—7 of Figure 1.

Figure 8 is a perspective view of a form of clincher member employed.

Figure 9 is a perspective view of a form of sleeve member employed, and

Figure 10 is a perspective view of the clincher member similar to Figure 8 showing a modification.

Referring more particularly to the drawings 10 designates generally a coupling body constructed with an intermediate nut portion 11 having an externally screw threaded male member 12 projecting from one side thereof and a nipple 13 extending axially from the other side of such nut portion 11. The nipple 13 is of greatly reduced external diameter as compared with the external diameter of the nut portion 11 leaving an abutment wall 14 that is substantially vertical or substantially normal to the coupling axis.

Along the exterior of the nipple 13 are provided a series of buttress teeth 15 which taper toward the outer free end of the nipple 13 and provide the usual abrupt shoulders 16 disposed away from the free end of said nipple. In the coupling body 10 is a through opening or bore 17 in the customary manner. In one form of the coupling body the nipple 13 at its inner portion adjoining the abutment wall 14 and inwardly of the innermost buttress tooth 15 is formed with a substantially cylindrical or annular neck 18.

The hose illustrated is that well known form consisting of the inner and outer concentric layers 19 and 20 with an intermediate embedded concentric layer of wire mesh or other reinforcement 21.

Upon the nipple 13 there is fitted a clincher or spider member illustrated in perspective in Figure 8. Such member may be blanked out from suitable gauge spring steel stock and bent to shape to produce a base member 22, for instance in the form of a disc having a central opening to admit of its being slipped over the nipple 13. The base member carries spring fingers 23 projecting in a direction generally inward of the base 22 but canted or inclined angularly or diagonally. The spring fingers 23 are separated by V-shaped or other slits 24 which admit of a relative movement of the fingers with respect to one another along the spring hinge lines defined by their juncture with the disc base 22. These fingers 23 may be generally triangular in form with their base lines forming their lines of hinge connection with the base 22 and with their outer free ends removed or truncated to produce blunt noses 25 for better cooperating with the innermost shoulder 16 of the nipple 13.

Still referring to Figure 8 and to the clincher or spider member, the base disc 22 carries at its outer edge a number, at least three or more, of elongated jaws 26 which are curved transversely on a radius to conform generally to the external curvature of the hose about which these jaws are adapted to clamp. Adjacent the disc 22 the jaws 26 have cut-out portions 46 to narrow down those portions of the jaws that are bent during the collapsing operation and to facilitate the transverse shaping of the jaws to the substantial contour of the hose. The number of jaws 26 required for the clincher member is determined by the size of the hose and the maximum amount of width of each jaw that may be permitted to assure a bending action of the jaw at its line of junction with the disc. The total width of the jaws in practice has generally been found to be from 60 to 80% of the circumference of the hose. The larger the coupling is the more jaws are required to approach the circumferential area of the hose that is to be embraced and still be within the bounds of permissible manufacture.

The jaws have bending line connection with the outer edge of the base disc 22 by which they are preferably integrally carried. All of the jaws carry teeth 27. A convenient form of tooth is the triangular tooth shown as struck from the body of the jaw and bent inwardly thereof. These teeth are cut along two sides of the triangle with the bases 28 forming the bending lines on which such teeth are up struck. These bending lines 28 are shown as extending in a longitudinal line, that is in a line longitudinally of the longated jaws 26, and such line is parallel with the coupling and hose axis for the purpose of presenting the teeth 27 edgewise to the direction of movement of the hose away from or out of the coupling body. With the teeth disposed in the above manner the maximum strength of the teeth is presented to any force tending to axially pull the hose out of the coupling. This arrangement precludes entirely the bending of the teeth and any disruption of the hose to the coupling with the teeth embedded into the wire mesh would either have to mutilate the pointed ends of the teeth or tear them loose at their line of connection with the jaws. While in this embodiment the minimum width of the teeth only are exposed to and serve to overcome any axial strains resulting in the outer layer of hose material, it is within the purview of this invention, if desired, to incline the teeth slightly to the axis of the coupling whereupon a broader area of the teeth will be effective against axial strains in the rubber material of the hose through which the teeth penetrate.

Other teeth 29 are preferably carried by each jaw 26 having base connecting lines 30 which connect the teeth 29 with the respective jaw 26. The teeth 29 may be also of triangular form reversely reproduced so that the apexes of the openings 31 and 32 left by the formation of the teeth 27 and 29 point mutually toward one another except that the line of teeth 27 and their openings 31 are staggered with respect to the line of teeth 29 and their openings 32. The staggered formation will not only avoid undue weakening of the jaws 26 but will also present the teeth 27 and 29 at different circumferential points on the hose.

Referring more particularly to Figure 10, a modified form of cylinder member is shown in which the disc 22ª is cup-shaped having a flange 47 from the free edge of which the jaws 26ª project. The cut-out portions 46ª occur at the points where the jaws 26ª join the edge of the flange 47 to facilitate bending of the jaws 26ª both transversely or arcuately and with reference to the flanged disc 22ª and hose.

In some cases the use to which the coupling may be put will require that the clincher member will be made stronger than in other cases. To this end the modification of Fig. 10 is presented wherein the base disc 22ª is cupped or provided with flange 47, which construction will strengthen considerably that portion of the clincher member.

A sleeve 33, shown more particularly in Figure 9, is adapted to be slipped over the coupling body and the jaws 26, and such sleeve is formed with a nut portion 34 to mate with the nut portion 11 of the coupling body 10. Adjoining the nut portion 34, the sleeve 33 is bulged outwardly slightly, as indicated at 35, to enable the main cylindrical body of the sleeve 33, exclusive of the nut portion 34, to be of an initially large diameter subject to being contracted upon the coupling, hose and clincher member. The nut portion 34 of the sleeve carries a flange 37 with an opening 36 to fit over the male end 12 of the coupling body.

In Figure 3 we have shown a plunger tool 38 having a socket 39 for aiding in the assembly of the clincher or spider member upon the coupling body and an anvil member 45 against which the adjacent face of the nut section may be abutted.

In Figure 4 we have illustrated a split die 40 having an opening 42 to pass over the hose with a flaring mouth 41 at one end for the purpose of engaging and die contracting the sleeve 33.

Referring to Figure 3, the coupling body 10 is shown to be of a variety of coupling body well known in the art. The clincher member shown in Figure 8 is assembled on this coupling body by initially placing the clincher member in the full line position shown in Figure 3 in which the central opening of the base 22 receives the nipple 13 and the inclined or canted spring fingers 23 lie along the outermost buttress tooth 15. The clincher member may be driven home over the nipple 13 in any suitable manner and by any suitable instrumentality. For convenience we prefer to employ an anvil 45 against which the body 10 seats and a plunger tool 38, the end of which is shaped to engage the disc base 22 and the socket 39 of which enables the tool to be received over the nipple 13 when the tool is thrust to the left, carrying with it the clincher member to the final or home position indicated in dotted lines in this Figure 3. In moving along the nipple 13, the fingers 23 will be alternately sprung outwardly by the progressively wider diameters of the buttress teeth 15 and allowed to snap inwardly by their own inherent elasticity behind the shoulders 16 as the fingers 23 surmount the widest base portions of the teeth 15 and clear the same to snap into the smallest diameters of the next presented tooth section 15.

In the home position the disc base 22 normally rests against the abutment wall 14 of the nut portion 11 of the coupling body while the spring fingers 23 clasp the cylindrical neck 18 with the blunt noses 25 thereof interlockingly positioned in back of the innermost annular shoulder 16 and may be adapted to engage the same when any abnormal axial strains are exerted upon the coupling.

Figures 3 and 8 show the relative position of the jaws 26 to the clincher member in a preassembled state. In other words the jaws 26 diverge outwardly. In this position the jaws 26 do not interfere with the assembly of the hose over the nipple 13 in the customary way.

The clincher member is preferably made of resilient steel and the jaws 26 are outwardly sprung initially so that they normally assume the position shown in Figures 3 and 8 in which such jaws are normally open or outstanding away from the nipple 13.

It is preferred that the material from which the clincher member is blanked be first relatively soft so as to permit the various forming operations necessary to make the member in the shape appearing in Figure 8. After the clincher member is formed it is tempered to give it the proper strength and resiliency and for the purpose of hardening the numerous triangular teeth on each of the jaws 26.

In assembling the improved coupling to a hose, the nipple 13 is first forced into the interior of the hose and the jaws 26 of the clincher member may be collapsed about the outside of the hose to an initial extent by squeezing such jaws 26 in the hand or by other means or by slipping the sleeve 33 thereover in the manner indicated in Figure 4. In this figure the nut portion 34 of the sleeve is shown as alined with the corresponding nut section 11 of the coupling body 10. This complemental interfitting of the two nut portions will serve to avoid rotation of the sleeve 33 relatively to the coupling body.

The flange 37 will arrest the axial motion of the sleeve 33 and indicate when the sleeve has been driven home to final position. This movement of the sleeve into the final position shown in Figure 4 further collapses the jaws 26 against the body of the hose. In this position of the parts the contracting die member 40 is forced over the sleeve member 33 starting from the inner end of such sleeve member and working outwardly, that is the die member 40 is moved to the left as viewed in Figure 4 or toward the anvil 45. This action of the die causes the radially inward contraction of the metallic sleeve 33 which will be made of a material admitting of this contraction and of a sufficient rigid body that on such contraction will withstand the outwardly bulging pressure of the hose and clincher member.

Obviously the die 40 cannot be moved over the nut portion 34 and the line indicative of the limit of die movement is shown in Figure 1, although this limit may be caused to approach closer to the nut portion if desired, or on the other hand may terminate more to the right away from such nut portion.

The high pressure hose will ordinarily be of a material which is relatively thick with an intermediate filler of numerous interwoven layers of wire strands 21. The teeth 27 and 29 of the jaws 26 are hardened to permit such teeth to penetrate through the outer rubber layer and the points thereof to be firmly embedded directly into the wire mesh, as indicated in Figure 2, thereby assuring a very strong coupling connection.

It will be noted, particularly from Figure 4, that the sleeve 33 has a twofold function in that: first it is very easily put into initial place and in such initial place (Figure 4) such sleeve holds the hose and the other parts together in assembled relation while the die 40 is moved over the sleeve; second in its final condition of radial contraction the sleeve 33 (Figures 1 and 2) compresses the hose and contracts the clincher or spider member and serves to maintain all of the parts in the final set up position.

From the foregoing it will be appreciated that the improved coupling acts to interlock the parts so as to prevent axial displacement of the parts relative to each other, as well as the hose relative to the coupling. The ability of the coupling parts to hold securely against axial strain results from the construction, relative arrangements of the parts in the combination and exhibits itself in the following manner. The teeth of the jaws are caused to penetrate through the outer layer of rubber material and bite securely into the wire mesh of the hose. Any force tending to axially dislodge the hose will be transmitted through the teeth to the jaw members, then in turn through the disc to the spring fingers which are securely engaged and locked in back of the innermost buttress tooth of the nipple.

The axial strains which the present invention has been designed to cope with are not so much external pulling on the hose or on the coupling as those which result from the internal high pressure force that is transmitted through the hose. Such internal high pressure force, as for instance in grease guns, tends to blow the coupling off the end of the hose and the improved high pressure coupling is designed and built to withstand such shock and simultaneously to be leak proof.

Another advantage derived from the novel form of construction of the present invention is that the various parts can be made of different materials depending upon the conditions to which the couplings are subjected. Such concept is new in relation to high pressure couplings now on the market which are made of one piece. Such one piece couplings are either turned out from solid rod or made by a forging process; in both cases presenting a kind of material that is difficult to deform. In the present instance there is no need to deform the body part; but the outside sleeve, which is to be deformed, can be selected of a material that is fitted for that purpose. For the strength that is needed the jaw members may be made of steel and hardened after they are formed. Where the coupling is to be used in airplanes, both body and shell parts may be made of aluminum. In case the coupling is to be subjected to a highly abrasive fluid, the body part that will have to withstand the abrasive action may be made of a suitable steel. In this sense the present invention provides flexibleness in the coupling enabling it to readily lend itself to various uses and conditions.

In contracting the outside sleeve in the manner done by forcing the die from the outer end inwardly subjects the hose material confined within the coupling to such a tremendous pressure as to cause the part of each gripper jaw lying next to the bulbous part 35 of the sleeve or shell 33 to be sprung into the hollow cavity thereof, as shown in Figure 2. Such distortion of the jaws provides a still further mechanical advantage to prevent axial derangement of the parts.

Present commercial high pressure couplings require that the outside layer of rubber material of the hose be ground or skived off down to the wire mesh and the coupling collapsed directly upon such wire mesh. Our invention obviates any such removal of rubber material and provides means for penetrating the outer layer of the rubber and interlocking or embedding into the wire mesh for a secure point of anchorage.

Heretofore high pressure couplings have been made of brass or other deformable material. Such material is not very hard and the teeth become easily dulled. However with the present form of device the clincher member may be made of steel which is heat treated so that the hardened teeth that are embedded into the wire mesh will not have their points easily dulled or mutilated.

It is obvious that various changes and modifications may be made in the details of construction and design of the above specifically described embodiment of this invention without departing from the spirit thereof, such changes and modifications being restricted only by the scope of the following claims.

What is claimed is:

1. An improved hose coupling comprising a coupling body having a nipple with an external surface formed of successive buttress teeth providing abrupt shoulders between the teeth and an abutment wall spaced from but adjacent the innermost shoulder, and a clincher member comprising jaws and a connection base resting freely against said abutment wall and having spring fingers in the space between the abutment wall and innermost shoulder and confined by the latter against axial movement in that direction and a sleeve means movable over said jaws from the base portion outwardly and contracted thereagainst to compress the hose between the jaws and the nipple, and a means interlocking said sleeve with said body to prevent relative rotation.

2. A coupling comprising a coupling body having a polygonal portion and a nipple having shouldered buttress teeth, a hose fitted over said nipple, a clincher member fitted freely against said nut portion and having spring fingers contacting the nipple and a shoulder of a buttress tooth, said clincher member also having normally outsprung jaws with teeth thereon adapted to bite into said hose, and a sleeve having a cylindrical portion slid over said clincher member and included portion of the hose and having a polygonal portion complemental to the polygonal portion of the coupling body and a flange for engaging a side of said polygonal portion opposite from said clincher member to limit the axial sliding movement of said sleeve over said clincher member.

3. A coupling for a hose having inner and outer concentric layers with a layer of mesh reinforcement therebetween comprising a coupling body having a shouldered buttressed toothed nipple entering an end portion of the hose, a clincher member having a yieldable part interlocked with the shouldered portion of the nipple and also having a movable jaw for contacting the outer portion of the hose, said jaw having teeth of substantially triangular form cut and struck out of the material of said jaw along base lines which extend substantially parallel to the axis of the coupling and hose, and a sleeve contracted against the outer surface of said jaw to move the jaw forcibly radially inwardly against the hose to cause said teeth to enter the meshes of the hose reinforcement.

4. A coupling for hose and the like embodying inner and outer concentric rubber layers with an intermediate layer of mesh metallic reinforcing material comprising a coupling body having a nut portion and a shouldered nipple extending into an end of said hose, a clincher member having a base portion lying freely against said nut portion and also having spring fingers contacting said nipple and engaging the shouldered portion thereof, said clincher member also having jaws foldable inwardly upon the outer portion of the hose, said jaws having two series of triangular teeth arranged in relatively staggered formation and with their apexes directed inwardly toward one another, said triangular teeth being bent inwardly upon their long base lines which extend longitudinally of the coupling axis, said teeth being sufficiently long to penetrate the outer hose layer and enter the interstices of the mesh reinforcement, and a sleeve contracted about said jaws to move the jaws forcibly radially inwardly against the hose to cause said teeth to enter the meshes of the hose reinforcing material.

5. In a coupling for high pressure hose comprising a coupling body having a flanged section and a nipple to fit within the end of the hose, a clincher member having jaws for engaging the outside of the hose and means for snap locking engagement with said nipple, said jaws having teeth for engagement in the hose material, a deformable sleeve telescoped over said flange and said clincher member having means abutting at one end against said flange as a stop, said sleeve being die-contracted from the other end outwardly a portion of its length and having an intermediate swelled portion within which the material of the end of the hose and the adjacent section of the jaws are deformed coincident with the contracting operation.

6. A coupling for high pressure hose comprising a coupling body having a flanged section and a nipple to fit within the end of the hose, a clincher member having jaws for engaging the outside of the hose and means for interlocking engagement with said nipple, said jaws having teeth for engagement in the hose material, and a deformable sleeve telescoped over said flange and said clincher member having means abutting at one end against said flange as a stop, said sleeve having an intermediate swelled portion within which the material of the end portion of the hose and jaws are received.

7. A coupling for high pressure hose comprising a coupling body having a part to fit within the end of a hose, a clincher member having means to interlock with said coupling body and provided with external means for engaging the outside of the hose, and a deformable sleeve telescoped over said coupling body and clincher member being die-contracted for a portion of its length down to a diameter to cause squeezing of the external means tightly upon the hose, said deformable sleeve in its deformed condition having a swelled portion within which the material of the hose and included material of said external means are received.

8. An improved hose coupling comprising a coupling body having an intermediate flange and a nipple to fit within the hose, a buttress tooth circumventing said nipple and spaced from said flange, a clincher member comprising an annular base abutted against the inner or nipple side of said flange and having equally spaced spring fingers biased from the inner edge of said base and interlocked with said buttress teeth, jaws integrally formed to the outer edge of said base and initially sprung outwardly therefrom, a sleeve means adapted to be slipped over said jaws from the base end of said clincher member toward the outer free end of said jaw to move the same inwardly upon the hose, and a stop flange integral with said sleeve abutted against the outer wall of said body flange as a stop.

9. A high pressure hose coupling comprising a substantially rigid coupling body having a nipple to enter the hose and a polygonal enlarged portion, a separate malleable sleeve having a polygonal portion closely fitting over the corresponding polygonal portion of the coupling body, and a generally cylindrical skirt portion enveloping the hose and nipple and die-contracted substantially throughout its cylindrical area into squeezing relation upon the hose, and clincher means interlocked with said nipple and interposed between the hose and said die-contracted sleeve.

10. A high pressure hose coupling comprising a substantially rigid coupling body having a nipple to enter the hose and an enlarged polygonal portion, a separate malleable sleeve having an open end and a substantially cylindrical skirt of sufficient initial diameter to axially slide over the enlarged portion to cause the skirt to envelop the nipple and included part of the hose, said sleeve having a polygonal portion to slide on and mate with the enlarged portion of the coupling body, said sleeve also having means on the end portion opposite to the open end to engage with the enlarged portion to arrest the axial movement of the sleeve in its final home position, said sleeve being die-contracted substantially throughout its entire cylindrical area to compress the hose radially inward at all circumferential points upon the rigid nipple, and clincher means interlocked with said nipple and interposed between said hose and die-contracted sleeve.

ALBERT C. LUSHER.
ALLAN C. HOFFMAN.